(12) United States Patent
van Boxtel

(10) Patent No.: US 7,533,929 B2
(45) Date of Patent: May 19, 2009

(54) OPEN ROOF CONSTRUCTION FOR A VEHICLE

(75) Inventor: Eduardus Christianus Henricus van Boxtel, Zeeland (NL)

(73) Assignee: Inalfa Roof Systems Group B.V., Venray (NL)

( * ) Notice: Subject to any disclaimer, the term of this patent is extended or adjusted under 35 U.S.C. 154(b) by 48 days.

(21) Appl. No.: 11/939,051

(22) Filed: Nov. 13, 2007

(65) Prior Publication Data

US 2008/0111400 A1    May 15, 2008

(30) Foreign Application Priority Data

Nov. 10, 2006    (EP)    ................................. 06123795

(51) Int. Cl.
*B60J 7/22*    (2006.01)

(52) U.S. Cl. ...................................... 296/217

(58) Field of Classification Search ................... 296/217
See application file for complete search history.

(56) References Cited

U.S. PATENT DOCUMENTS

| | | | |
|---|---|---|---|
| 4,089,557 A | 5/1978 | Leiter | |
| 4,798,410 A | 1/1989 | Weller et al. | |
| 4,966,409 A | 10/1990 | Schmidhuber et al. | |
| 7,121,618 B2 | 10/2006 | Uehara et al. | |
| 2001/0019217 A1 | 9/2001 | Hertel et al. | |

FOREIGN PATENT DOCUMENTS

| | | |
|---|---|---|
| DE | 3825838 C1 | 11/1989 |
| EP | 0264560 A2 | 4/1988 |
| EP | 1112875 B1 | 3/2006 |

OTHER PUBLICATIONS

Official Search Report of the European Patent Office in counterpart foreign application No. 06123795.4 filed Nov. 10, 2006.

*Primary Examiner*—Dennis H Pedder
(74) *Attorney, Agent, or Firm*—Steven M. Koehler; Westman, Champlin & Kelly, P.A.

(57) ABSTRACT

An open roof construction for a vehicle is provided, comprising a roof opening provided in a stationary roof part and closure assembly comprising a closure element which is movable between positions for closing and opening the roof opening and which can assume a tilted position for at least partially opening the roof opening, in which tilted position a rearward edge of the closure element is lifted, and wherein in the region of the opposite longitudinal edges of the closure element telescopingly movable cover members are provided for covering a gap created when the closure element is not in its closure position. At least one of the cover members is operatively connected to the stationary roof part by means of two longitudinally spaced biasing devices for biasing said cover member upwardly away from the stationary roof part and against the closure element, wherein at a location intermediate the longitudinal forward and rearward ends of said cover member, and in the region of the forward end abutment devices are provided for limiting the upward movement of said cover member and wherein the intermediate abutment devices defines a pivot for said cover member.

7 Claims, 2 Drawing Sheets

OPEN ROOF CONSTRUCTION FOR A VEHICLE

BACKGROUND

The discussion below is merely provided for general background information and is not intended to be used as an aid in determining the scope of the claimed subject matter An open roof construction for a vehicle, comprising a roof opening provided in a stationary roof part and a closure element which is movable between positions for closing and opening the roof opening and which can assume a tilted position for at least partially opening the roof opening, in which tilted position a rearward edge of the closure element is lifted, and wherein in the region of the opposite longitudinal edges of the closure element telescopingly movable cover members are provided for covering a gap created when the closure element is not in its closure position.

Open roof constructions of this type are described in U.S. Pat. No. 4,089,557 and published US-application 2005/0218704 in which the cover members at their forward ends are hingedly connected to a transverse rotation axis.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

An open roof construction includes at least one of the cover members is operatively connected to the stationary roof part by two longitudinally spaced biasing devices for biasing said cover member upwardly away from the stationary roof part and against the closure element, wherein at a location intermediate the longitudinal forward and rearward ends of said cover member, and in the region of the forward end abutment devices are provided for limiting the upward movement of said cover member and wherein the intermediate abutment devices defines a pivot for said cover member.

In the fully closed position of the closure element said cover member engages the closure element (or other elements connected therewith) while both biasing devices are maximally loaded. When the closure element assumes the tilted position (rearward edge lifted) the corresponding rearward edge of said cover member is pushed upwards by the corresponding biasing devices while its forward edge remains substantially in the same position. Thus said cover member assumes an inclined position in which the resulting gap between the closure element and the stationary roof part is effectively covered. When, next, the forward edge of the closure element also would be lifted, the forward edge of said cover member is pushed upwards by the corresponding biasing devices. As a result said cover member engages and pivots around the intermediate abutment devices (which leads to a lowering of the rearward edge thereof) until the forward abutment devices stops this rotational movement. In this position of said cover member its orientation is defined by both abutment devices and it disengages the closure element which is free to move, for example slide backwards for freeing the roof opening.

In one embodiment of the open roof construction the intermediate abutment device is located substantially halfway the longitudinal forward and rearward ends of the closure element. The exact location, however, will be determined by constructional features of the open roof construction (among which include dimensions and movement ranges).

Further, it is possible that the intermediate abutment device is defined by the upper end of a guideway for a pivot member of said cover member. This upper end defines the upper position attainable by the pivot member, and thus defines a pivot axis therefor.

In one embodiment, the biasing devices are leaf springs. Such leaf springs combine a low weight with a large operating range and fine operating characteristics.

In yet another embodiment of the open roof construction the forward edge of the closure element also can be lifted and the closure element, with its forward and rearward edges lifted, can be slid backwards to at least partially free the roof opening, and the positions of the abutment devices are such that in said entirely lifted position of the closure element said cover member engages both types of abutment devices and is disengaged from the closure element.

In such a case it is preferred that the most forward biasing devices is constructed to generate a moment around the intermediate abutment devices surpassing the moment generated by the rearward biasing devices. As a result it is assured that, when the closure element is lifted with its forward and rearward edges, said cover member assumes a position in which it engages both abutment devices.

The open roof construction is constructed such that the cover members comprise said movable cover member, an upper cover member attached to the closure element and a lower stationary closure member attached to the stationary roof part. As a result also large gaps may be covered effectively.

BRIEF DESCRIPTION OF THE DRAWINGS

Hereinafter the invention will be elucidated while referring to the drawing, in which.

DETAILED DESCRIPTION OF THE ILLUSTRATIVE EMBODIMENT

Figure 1:
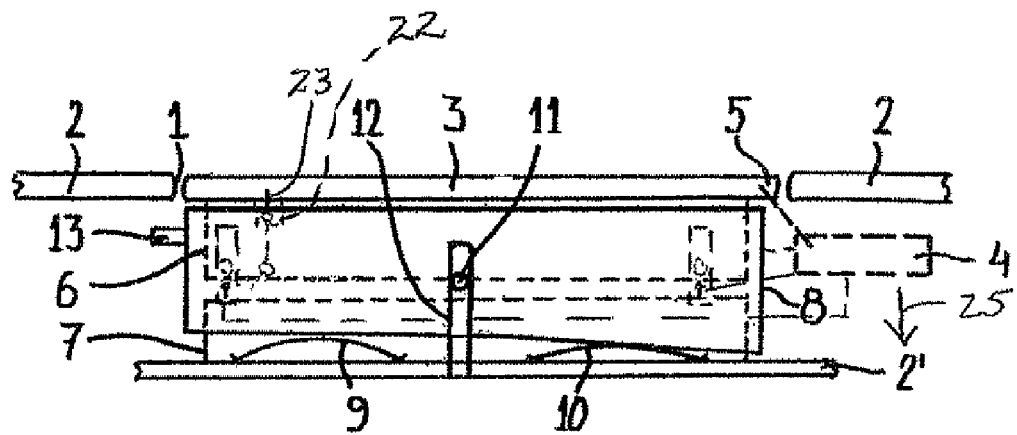
FIG. 1 shows, schematically, a side elevational view of an embodiment of an open roof construction in a first, fully closed, position.
Figure 2:
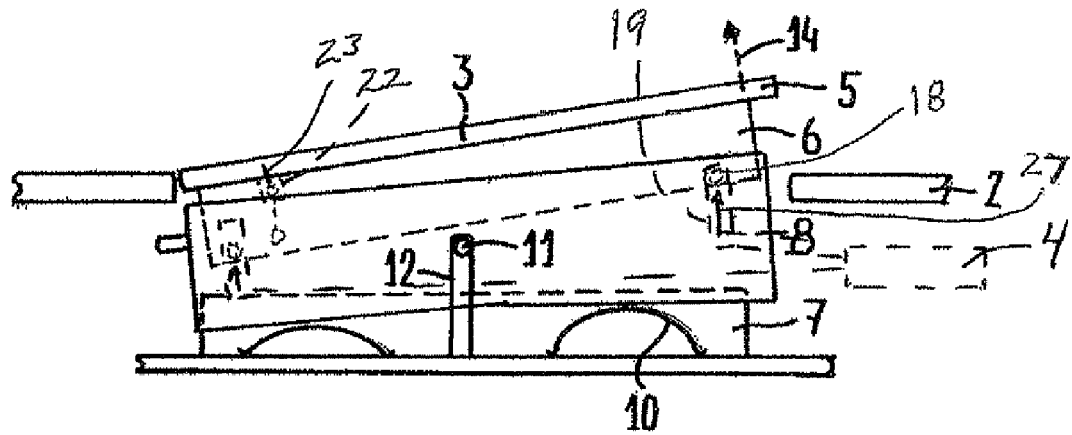
FIG. 2 shows the open roof construction of FIG. 2 in a partially open, tilted position.
Figure 4:
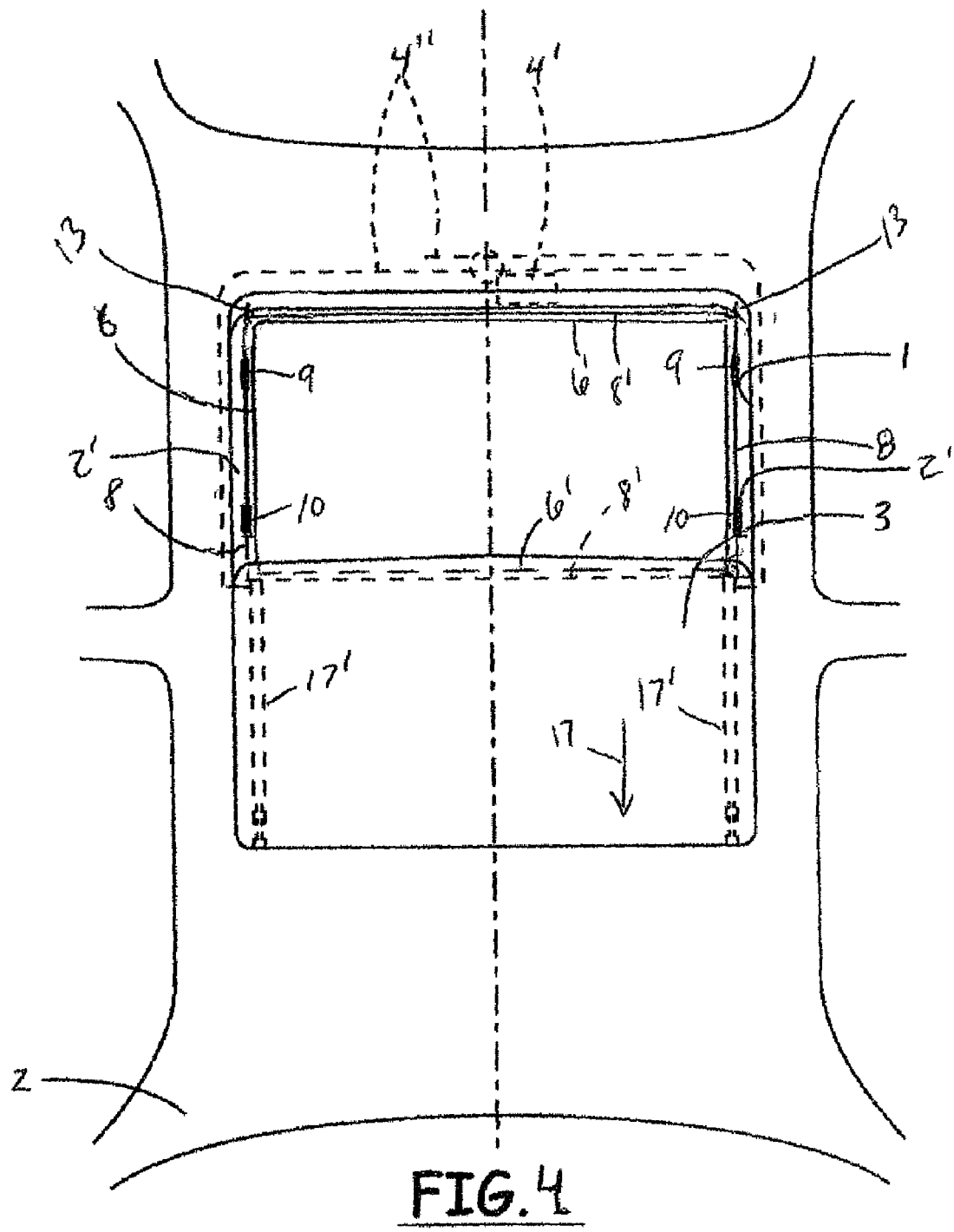
FIG. 4 shows a top plan view of the open roof construction.

Firstly referring to FIG. 1, an open roof construction for a vehicle is shown. The open roof construction comprises a roof opening 1 provided in a stationary roof part 2 of a vehicle (herein the roof part 2 also represents the vehicle). The open roof construction includes a closure assembly for the roof opening 1. The closure assembly includes a closure element 3 which is driven by drive device 4 only indicated schematically in FIG. 1. Referring to FIG. 4, drive devices are well-known in the open roof construction art and can include hand cranks and/or motors 4' coupled to drive cables 4" that in turn are coupled to slides and/or links that when displaced lift, lower and/or horizontally displace the closure element 3 and/or elements connected thereto so as to open or close the roof opening 1. Among others, the closure element 3 can assume a tilted position as illustrated in FIG. 2, in which a rearward edge 5 (for forward motion of the vehicle) of the closure element 3 is lifted.

Attached to the lower side of the closure element 3 is telescoping panel assembly herein comprising an upper cover member 6 and a lower cover member 7 that is attached to a part 2' of the stationary roof part 2. Intermediate the upper cover member 6 and lower cover member 7 is a cover member 8 to be described later.

In the figures the cover members 6, 7 and 8 are illustrated in a fairly separated manner to better show the aspects of the present invention. In practice, however, such cover members 6, 7 and 8 will overlap each other to a greater extent such as to obtain a compact construction. Specifically, in the situation shown in FIG. 1 also cover members 6 and 7 will be in an overlapping relationship. As illustrated in FIG. 4, cover members 6, 7 and 8 are disposed along side edges of the roof opening 1 that extend longitudinally in the direction of vehicle motion. In the embodiment illustrated, one or more transverse panel portions (herein represented by portions 6' and 8') can also be provided.

Figure 3:
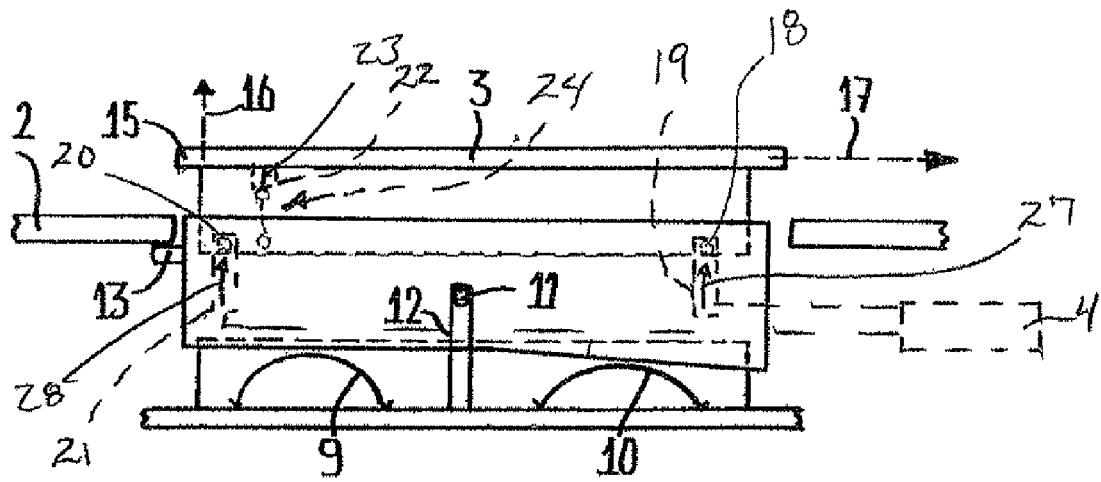
FIG. 3 shows the open roof construction of FIG. 1 in an open position.

Cover member 8 is operatively connected to the stationary roof part 2' by two longitudinally spaced biasing devices 9 and 10 which urge the cover member 8 upwardly relative to the stationary roof 2 or 2'. In the illustrated embodiment, biasing device 9 and 10 are exemplified by leaf springs. FIGS. 1-3 illustrate one side of the open roof construction, the other side is a mirror image of the side illustrated. Although the leaf springs are particularly advantageous, it should be understood that other forms of springs can be used, and furthermore, other devices that can provide an upward force including links, arms, cams, actuators, etc. can also be used.

The cover member 8 and stationary roof part 2' are movably coupled together. In the illustrative embodiment, attached to the cover member 8 is a pivot member 11 which is movably housed in a guide way 12 attached to stationary roof part 2'. At its forward end cover member 8 carries an abutment device herein exemplified as pin 13.

In the closed position of the closure element 3 illustrated in FIG. 1 cover member 8 (directly or indirectly) engages or is coupled to the closure element 3 and is pushed downwardly, herein against the preload of the leaf springs 9 and 10 by operation of the drive 4 such as through a cam, wedge, lever and/or spring mechanism, herein represented by arrow 25. In this position, the pivot member 11 is positioned below the upper end of the guide way 12.

When, according to FIG. 2, the rearward edge 5 of closure element 3 is lifted (as indicated schematically by arrow 14), the corresponding rearward part of cover member 8 is free to move upwardly under influence of the force of leaf spring 10. This movement is continued until pivot member 11 abuts the upper end of guide way 12. The forward part of cover member 8 still is engaged by closure element 3 and substantially remains in the same position. As a result cover member 8 assumes a tilted position as illustrated in FIG. 2. Movement of the closure element 3 to this position is initiated by drive 4, herein schematically illustrated by further movement rearward in FIG. 2. In the illustrated embodiment, cover member 6 moves with closure element 3 relative to cover member 8 with a cam, wedge, lever and/or spring mechanism represented by arrow 27. As appreciated those skilled in the art, various types of sliding and/or guiding mechanisms can be used to provide such movement. Herein, this is schematically exemplified, by a pin 18 of cover member 6 moving in a guide 19 of cover member 8.

When, next, also a forward edge 15 of the closure element 3 is lifted (indicated schematically by arrow 16), also the corresponding forward part of cover member 8 moves upwardly, under influence of leaf spring 9. At the same time, cover member 8 pivots around the combination of pivot member 11 and upper end of guide way 12 (which, in a manner of speaking, defines a pivot for the pivot member 11) such as to assume a position, in which abutment pin 13 abuts the stationary roof part 2 (or any other abutment provided therefor). This situation is shown in FIG. 3.

Movement of the closure element 3 to this position is also initiated by drive 4, herein schematically illustrated by yet further movement rearward in FIG. 3. In the illustrated embodiment, cover member 6 moves with closure element 3 relative to cover member 8 with a cam, wedge, lever and/or spring mechanism represented by arrow 28. As appreciated those skilled in the art, various types of sliding and/or guiding mechanisms can be used to provide such movement. Herein, this is schematically exemplified, by a pin 20 of cover member 6 moving in a guide 21 of cover member 8.

Now the cover member 8 is lifted entirely, but is disengaged (directly or indirectly) from closure element 3 which, thus, may be moved (in a sliding manner) rearwardly (as indicated by arrow 17 on suitable slides mechanism 17' in FIG. 4) for freeing the roof opening 1. In the illustrated embodiment, a locking device 22, schematically illustrated as having an engaging protrusion 23, selectively locks the closure element 3 in place relative to cover member 6. A link mechanism 24, schematically illustrated, links cover member 6 with cover member 8 and operates the locking device 22 when the cover member 6 obtains a selected position relative to cover member 8. It should be understood that numerous types of locking devices can be used, which can be operated by movement of other elements of the closure assembly and/or the drive 4 directly. Furthermore, if the cover member 6 is not present, or if it moves with the closure element 3, the locking device 22 can be used to selectively, fixedly join the closure element 3 to the cover member 8.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims

The invention claimed is:

1. A closure assembly for open roof construction for a vehicle having a roof opening provided in a stationary roof part, the closure assembly comprising:
   a closure element which is movable between positions for closing and opening the roof opening and which can assume a tilted position for at least partially opening the roof opening, in which tilted position a rearward edge of the closure element is lifted,
   telescoping cover members disposed in the region of the opposite longitudinal edges of the closure element of size for covering a gap created when the closure element is not in its closure position,
   two longitudinally spaced biasing devices operatively connected to at least one of the cover members so as to urge said at least one cover member upwardly toward the closure elementrelative to the stationary roof part and
   a plurality of abutment devices, comprising an intermediate abutment device disposed at a location intermediate the longitudinal forward and rearward ends of said at least one cover member, and a forward abutment device disposed in the region of the forward end of the at least one cover member, each of the abutment devices are configured to limit the upward movement of said at least one cover member and wherein the intermediate abutment device defines a pivot for said at least one cover member.

2. The closure assembly according to claim 1, wherein the intermediate abutment device is located substantially halfway between the longitudinal forward and rearward ends of the closure element.

3. The closure assembly according to claim 1, wherein the intermediate abutment device comprises an upper end of a guideway for a pivot member of said at least one cover member comprising the pivot.

4. The closure assembly according to claim 1, wherein each of the biasing devices comprise a leaf spring.

5. The closure assembly according to claim 1, wherein a forward edge of the closure element also can be lifted and the closure element, with its forward and rearward edges lifted, can be slid backwards to at least partially free the roof opening, and wherein the positions of the abutment devices are such that in said entirely lifted position of the closure element said at least one cover member engages both types of abutment devices and is disengaged from the closure element.

6. The closure assembly according to claim 1, wherein a most forward biasing device is configured to generate a moment around the intermediate abutment device surpassing a moment generated by the rearward biasing device.

7. The closure assembly according to claim 1, wherein the cover members comprise said movable at least one cover member, an upper cover member attached to the closure element and a lower stationary closure member configured to be attached to the stationary roof part.

* * * * *